June 13, 1944. A. W. FERGUSON Re. 22,494

REDUCTION OF METALS TO A POWDER

Original Filed Jan. 28, 1938

INVENTOR
Allan W. Ferguson
BY
Parker, Prochnow & Farmer.
ATTORNEYS

Reissued June 13, 1944 Re. 22,494

UNITED STATES PATENT OFFICE 22,494

REDUCTION OF METALS TO A POWDER

Allan W. Ferguson, East Aurora, N. Y., assignor to Oxides, Inc., Buffalo, N. Y.

Original No. 2,209,964, dated August 6, 1940, Serial No. 187,424, January 28, 1938. Application for reissue January 31, 1944, Serial No. 520,493

17 Claims. (Cl. 83—91)

This invention relates to the reduction of metals, particularly lead and the metals of low fusion point, to a very finely divided powder. Finely divided or powdered metals such as lead and powdered lead oxides, have substantial markets, but their production heretofore has been relatively expensive when maximum fineness has been desired.

An object of this invention is to provide an improved method for rapidly and inexpensively reducing metals and the like to a very finely divided powder containing a maximum possible percentage of uniformly and exceptionally fine particles.

Another object of this invention is to provide an improved method of reducing metals, and particularly those of low fusion point, such as lead, to a very finely divided powder of which 90% or more so obtained will easily pass through a 200 mesh screen, with which one may obtain a metal in the form of a powder, the particle surfaces of which will have a minimum coating of oxide thereon, and the fineness of which in substantial or commercial quantities obtainable at prices making their ready sale possible, is greater than has been available by other methods.

Another object of the invention is to provide an improved apparatus by which low fusion point metals, such as lead, may be reduced to a finely divided powder of exceptional fineness, with which the proportion of the metal reduced to such fineness will be a maximum and greater than heretofore has been possible, with which a remarkable uniformity in the degree of such fineness of the powdered metal may be obtained, which will be compact, efficient and inexpensive in construction, and with which the cost of operation will be relatively low.

Another object of the invention is to provide improved methods and apparatus for producing a powdered metal, of relatively low fusion temperature, of such fineness that subsequent milling or reduction in size of the particles will be unnecessary, and which in the case of powdered lead, can be easily converted into oxides of different kinds with a minimum residue or proportion of metal or unoxidized lead in the particles.

Various other objects and advantages will appear from the following description of two examples of the invention, and the novel features will be pointed out hereinafter in connection with the appended claims.

Figure 1:
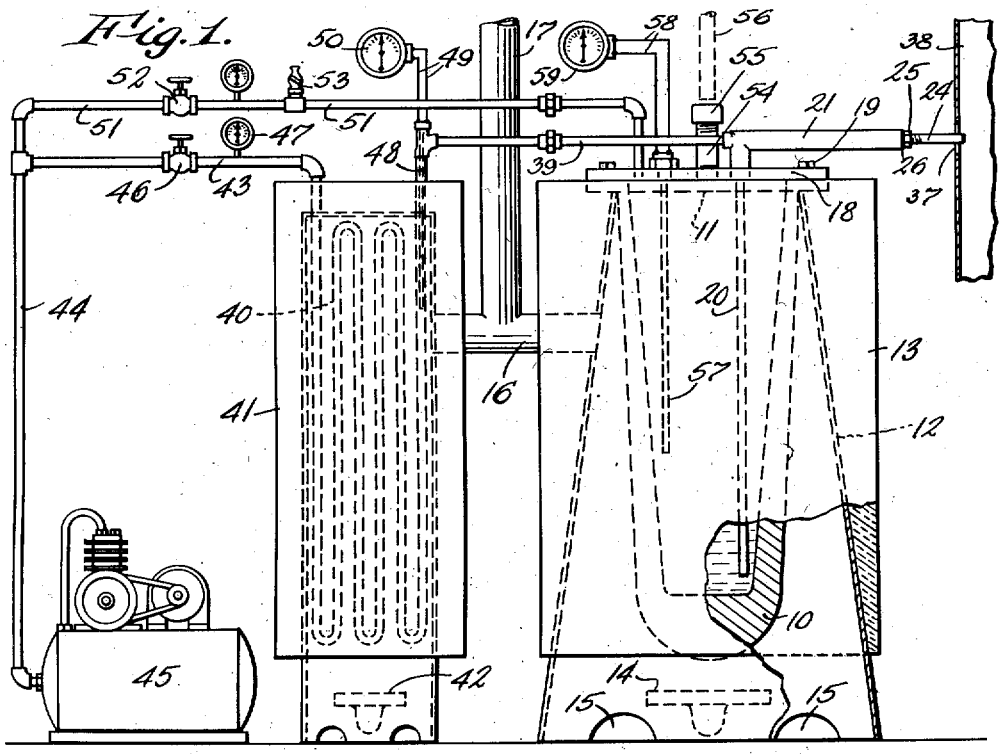
Fig. 1 is an elevation of apparatus constructed in accordance with this invention and particularly useful for the practice of the method of this invention and illustrating one example thereof.

In the example of the invention illustrated in Figs. 1 to 4 inclusive, the apparatus illustrated includes a pot 10 of any suitable material which will withstand the temperature to which the lead or other metal must be raised. This pot is suspended by a flange 11 at its upper end from a suitable enclosure 12 having insulation 13 encircling it. A suitable burner 14 or other suitable heater is placed in the bottom of the cabinet beneath the pot, and the enclosure 12 is provided at its lower end with openings 15 for the admission of air to support combustion of the gas discharged by the burner 14. The waste gases of combustion from the enclosure 12 are removed in any suitable manner such as through a pipe 16 leading from adjacent the upper part of the enclosure 12 to a stack 17. The pot 10 is closed at its upper open end by a plate 18 which is removably clamped to the open face of the pot in any suitable manner such as by means of screws 19 passing through the plate 18 into the flange 11.

A pipe 20 passes through the plate 18 and depends therefrom into the pot 10 to a point adjacent the bottom of the pot, and after passing upwardly through the plate 18 it enters a casing 21 forming part of the spraying or atomizing device. The casing 21 is L-shaped in general form, and the pipe 20 enters the short arm of the L and then bends and extends along the long arm of the L which is preferably in a horizontal position, as shown in Fig. 1. Short fins 20a secured on the pipe 20 within the casing 21 engage with the casing 21 and space the pipe 20 from the wall of casing 21. These fins run in directions lengthwise of the pipe and do not offer material resistance to gas flow through casing 21. The pipe 20 is of course anchored and sealed firmly in the plate 18, and the lower end of the casing 21 where the pipe 20 enters it is of course also sealed and connected to the plate 18 so as to be a unit therewith. The passage 22 in the casing 21 through which the passage 20 extends is provided at the free end of the long arm of the L of the casing 21 with a tapered or progressively reduced zone 23, which terminates in an orifice into which a sleeve 24 is mounted, preferably for limited adjustment in a direction into and out of the casing 21.

The sleeve 24, for example, may be threaded into the opening in the end of casing 21 and locked in different adjusted positions therein in any suitable manner, such as by a lock nut 25 and a lock washer 26. The tapered portion or zone 23 of the casing 21 thus acts as a progressively constricting or converging portion of the passage 22 which leads to the opening in the sleeve 24, as shown clearly in Fig. 2. The outer end of the sleeve 24 is constricted to a spraying orifice 27, and the outer end zone of the passage 28 of the sleeve 24 preferably converges or tapers somewhat gradually or progressively towards the restricted orifice 27.

The portion of pipe 20 which extends along the horizontal arm or leg of the casing 21 has a reduced extension or terminal end 29, which projects into the passage 28 of the sleeve 24 to a substantial extent but which terminates a substantial distance in advance or in front of the spraying orifice 27 in the sleeve 24. The passage 30 of the pipe 20 merges into the smaller passage 31 of the extension 29 through a tapered or progressively changing zone 32, so that as the metal from the pot 10 leaves through the pipe 20, its travel will be speeded up by the tapered zone 32 as it enters the passage 31 of the extension 29. This passage 31 at its discharge end is split or divided into a plurality of separate passages 33 and 34 of substantial length which extend to the discharge end of the extension 29 and there terminate in countersunk or flared ends 35 and 36 respectively. The extension 29 is, of course, substantially smaller than the passage 28 in the sleeve 24, and it is so positioned in the sleeve 24 and the passages 33 and 34 are so spaced from one another that the longitudinal axes of the passages 33 and 34 will be approximately in line with the periphery of the discharge orifice 27 of the sleeve 24. The conduits 33 and 34 are thus eccentrically mounted with respect to orifice 27.

Any number of passages 33 and 34 may be employed in the extension 29, but all of them preferably have the diverging or flaring discharge ends directed towards the periphery of the orifice 27 so that the streams of molten metal discharged from passages 33 and 34 will be of the spreading pencil type as they leave the extension 29 and enter the passage 28. The length of passages 33 and 34 may vary to some extent, but they are preferably long enough so that the liquid metal passing therethrough will be discharged into passage 28 as slightly spreading pencil streams. If the passages 33 and 34 are too long and of too small diameters, they offer undesirable frictional resistance to the passage of the molten metal therethrough.

The discharge end of the sleeve 24 is preferably inserted through a window or opening 37 which is open to the atmosphere in a spray chamber 38 of any suitable design or character, and the atomized metal settles out of the atomizing gas in this chamber. A pipe 39 is connected to the casing 21, preferably approximately in line with the horizontal section thereof, so as to supply a gaseous atomizing medium to the passage 22 of the casing 21. The gaseous medium for disintegrating the molten metal may be air or any other suitable gas readily available, and where the metal is to be discharged without oxidation or other chemical change, the gas selected should preferably be one which is inert to harmful or appreciable chemical reaction with the metal under the atomizing conditions.

In the atomizing of molten lead, for example, the atomizing medium is conveniently air under substantial pressure, and this gaseous medium or air should preferably be heated to a temperature substantially in excess of the fusion point of the metal being atomized. The atomizing is so rapid once the air and lead streams meet that no material oxidation occurs through such contact. In the illustrated example of the invention, the pipe 39 which supplies this gaseous medium, such as air, to the atomizing device through the pipe is connected to one end of a pipe coil 40 provided in a heater cabinet 41 which is supplied with heat through a suitable gas burner 42 or in any other suitable manner. The gases of combustion from the burner 42 may also be conducted through the pipe 16 to the stack 17. The heater cabinet 41 may be of the insulated type, and the coil 40 may be a spiral or any other type of coil so long as it provides the necessary total length to obtain adequate exposure of the compressed gas to the action of the heat. A pipe 43 connects the other end of the coil 40 to a pipe 44 leading to a source 45 of compressed gas such as compressed air.

In the drawing I have illustrated conventionally a reservoir for air with a compressor and motor mounted thereon, but it will be understood that any other source of compressed air or other gas may be employed. For maximum efficiency of the apparatus and of the method, the gas under pressure should have not only a substantial pressure, but also a uniform pressure throughout operation. Other means, such as accumulators are well known for providing sustained pressures of any desired amount, and therefore it will be understood that the source 45 is illustrated only by way of example. A valve 46 is included in the pipe 43 for regulating the flow of gas or air through the pipe coil 40 in the heater and thence to the spray casing 21, and a pressure gauge 47 connected to the pipe 43 indicates at all times the pressure of the gas actually delivered to the spray casing 21.

A suitable temperature indicating device is provided in the pipe 39 for indicating the temperature of the air or gas delivered to the spray casing 21. For example, a pyrometer 48 may be inserted in the pipe 39 as it leaves the heater cabinet 41, and connected by wires 49 to a temperature indicator 50. A branch pipe 51 is connected to the pipe 44 before it reaches the valve 46 and this pipe contains a valve 52 therein by which the flow of gas through this branch pipe may be selectively regulated for a purpose which will appear presently. The pipe 51 is connected to the interior of the pot 10, such as by extending it downwardly through the plate 18 where it opens into the upper end of the pot 10. Thus when the valve 52 is open, a compressed gas such as air may be forced into the upper end of the pot 10, and the gas pressure therein will force the molten metal out of the pot through pipe 20.

A pet cock or bleeder valve 53 may be connected to the pipe 51 between the valve 52 and the pot 10, so that when the valve 52 is shut off, the pressure in the pot 10 may be restored to atmosphere. It also is a means for escape of air from the pot while the pot is being filled with further molten metal in any suitable manner. While the metal such as lead may be fused in the pot 10, this fusion may advantageously be carried on outside of the pot 10, and then admitted while in a molten condition to the pot 10. For this purpose a filling pipe 54 is provided on the plate 18, so as to open therethrough, and this pipe 54 is normally closed such as by a cap 55. When the pot 10 is to be filled with molten lead, the cap 55 may be removed from the pipe 54. A filling pipe 56 is then connected to the pipe 54 and the molten metal then delivered by gravity or under pressure from any melting pot (not shown) through the pipes 56 and 54 to the pot 10. During this filling, the air in the pot which is displaced by the entering molten metal may escape through the pipe 51 and bleeder valve 53.

After the pot 10 has been refilled, the pipe 56 is disconnected and the cap 55 replaced, whereupon the apparatus is again ready for a spraying operation as soon as the metal in the pot 10 has been brought to the desired temperature. In order to indicate the temperature of the molten metal in the pot at any time a suitable temperature indicating device, such as a pyrometer 57, may be mounted on the plate 18 so as to depend into the molten metal in the pot, and this depending portion of the pyrometer is connected in any suitable manner such as by wires 58 to the temperature indicating device 59, as usual in pyrometers.

In the operation of the apparatus illustrated in Figs. 1 to 4, the compressed air or gas is supplied from a source 45 and pipes 44, 43 and 51 to the heater cabinet 41 and to the upper end of the pot 10 under the control of the valves 46 and 52. The air in the pipe or coil 40 within the cabinet 41 is heated to the desired temperature which will be indicated by the indicator 50 as soon as there is any movement of air through the coil 40, and this heated air is delivered then to the spray casing 21 where it is conducted as a tubular stream through the passage 22 thereof to the passage 28 of the sleeve 24. With the plate 18 sealed on the top of the pot 10, and after the metal in the pot 10 has been raised to the desired temperature above its fusion point, the opening of valve 52 will place a gaseous pressure on the interior of the pot 10 and this pressure will then force the molten metal out of the pot 10 through the pipe 20 and discharge it into the passage 28 of the sleeve 24 as a plurality of small streams from the passages 33 and 34, which because of the flared discharge ends 35 and 36 will be of the expanding pencil or stream type.

The valve 46 is usually first opened to cause the air to pass through the heater cabinet 41 and thence through the spray casing 21 and sleeve 24, from which it is discharged through the constricted orifice 27. This heated air heats the casing 21 and the sleeve 24, as well as the portion of pipe 20 within casing 21, and the extension 29 above the fusion point of the metal in the pot 10, and while the air is thus passing the valve 52 may be opened to admit air pressure to the interior of the pot 10 and force the molten metal from the bottom of the pot out through the pipe 20. This causes the discharge of a plurality of pencil like streams into the passage 28 directly towards the periphery of the orifice 27. Thus the streams of molten metal are discharged into the stream of hot compressed gas or air in the passage 28, where the lead and air streams intermix. The gas or air passing under high pressure into passage 28 grabs, so to speak, the expanding pencils or streams of molten metal and tears them into small particles or globules, and the mixture is then forced under high compression and pressure through the orifice 27.

As the mixture of lead globules and compressed air or gas obtained in passage 28 leaves the orifice 27, the sudden release and expansion of the highly compressed air or gas with consequent abrupt fall in pressure of the mixture of streams of gas and lead, further divides the lead globules into a dust of exceptional fineness which is deposited in the chamber 38. Because of the spacing of the pencil-like streams of molten metal in the stream of gas in the passage 28, the compressed gas has an opportunity to enter each pencil-like stream of molten metal from all sides thereof and break it up into fine globules, and these globules of molten metal as well as the gas will still remain under a substantial pressure which is approximately that on the gas in the passage 28.

Some slight conception of the disintegrating action of a gas under pressure on a liquid also under pressure may be obtained by observation of the escape of a mixture of water and air from a domestic water supply faucet, after the water has been turned off at its entrance to a building, such as for replacing washers on faucets, and some air admitted to the pipes. Thereafter when the faucet is opened slightly, and pressure restored to the pipes, it will be observed that as either the air or water alone escapes through the cracked or slightly open faucet nothing happens, but when they both attempt to go through at the same time there is a violent reaction with a spitting or throwing of the water attempting to pass through with the air. The exact physical phenomenon thus obtained is not fully understood, but it is believed that the explosive or expanding effect of the compressed gas on the particles of water as they pass together through the restricted opening tends to blow apart or disintegrate the globules of liquid with a violence which is dependable to some extent upon the pressure under which the air or gas was held before its escape through the partially opened valve or a restricted orifice. It is believed that this same physical phenomenon is responsible for the increased fineness of the powdered metal obtained in accordance with this invention.

In the atomizing or powdering of lead, for example, the lead is preferably heated to a temperature well above its fusion point, which is sufficient to give it a high degree of fluidity because with a decrease in viscosity of the molten metal, the more effectively can the gas or air disintegrate it into finely divided particles. While the fusion point of lead is approximately 625° F., I have found that superior results are obtained when the temperature of the molten lead is raised to a temperature of at least 1100° F. and preferably the temperature range is around at least 1150° F. to 1200° F. The air or gas should be heated to a temperature above the fusion point of the metal, and preferably to a temperature of at least 1100° F. and while, under some conditions, hot air tends to oxidize the lead, I have found that the atomizing action is so rapid that very little oxidation of the disintegrated lead by the heated air results, and the atomized or powdered lead collected in the chamber 38 has a bright silvery color indicating that but little if any oxidation of the atomized lead has taken place.

The lead upon standing, however, in contact with air after a considerable interval of time will oxidize slowly and turn black, thus making a surface coating on the particles of what is familiarly known as black oxide of lead. The relation of the gas pressure on the lead which forces the lead out of the pot in streams into the passage 28, and the pressure of the gas or air delivered to the sleeve 24 for atomizing the lead, is very important if uniform and maximum fineness of the metal or lead is to be obtained. The ratio of the volume of air or atomizing medium to the weight of the metal atomized in a given time is also important. For example, a given minimum volume of air for each pound of metal so atomized must be provided, but this ratio will also depend to some extent upon the relative pressures on the metal and atomizing medium, and upon the particular metal being atomized.

More specifically, when lead has been atomized with compressed air by means of the apparatus shown in Figs. 1 to 4, where the orifice 27 had a diameter of ⅜ of an inch, air at approximately 80 lbs. per square inch pressure and at a temperature of approximately 1100° F. atomized molten lead to a powder, of which 98.2% passed through a 200 mesh screen, and the ratio of compressed air to lead employed was approximately 6 cubic feet of compressed air per pound of lead sprayed. The temperature of the lead sprayed was at least approximately 1100° F.

I have found that superior results are obtained when the pressure on the lead in the pot 10 is above about 25 pounds per square inch above atmospheric pressure and is preferably at least 30 to 40 pounds per square inch, and the pressure on the air or gas delivered to the sleeve 24 for atomizing or disintegrating the discharged streams or pencils of molten metal is substantially higher than that on the lead and preferably at least 80 to 100 pounds per square inch above atmospheric pressure. The pressures employed on the lead are sufficient to overcome the back pressure in the chamber 28 created by said gas. The higher the pressure on the disintegrating gas delivered through the sleeve 24, the greater the explosive or disintegrating effect on the streams of molten metal, but if such pressure is too high in proportion to that on the lead, this pressure will prevent the lead streams from being discharged. The cost of increasing the pressure on the air or gas used to disintegrate the metal increases rapidly with each increase in pressure beyond 100 pounds per square inch, and the increased fineness of the product so obtained does not always warrant the increased cost. By adjusting the sleeve 24 into and out of the spray casing 21 to various extents, the effective volume area of passage 28 or the distance from the discharge end of the passages 33 and 34 to the common discharge orifice 27 may be varied in a manner to obtain the maximum disintegrating efficiency for the particular operating pressures and for the particular metal being disintegrated.

Figure 2:
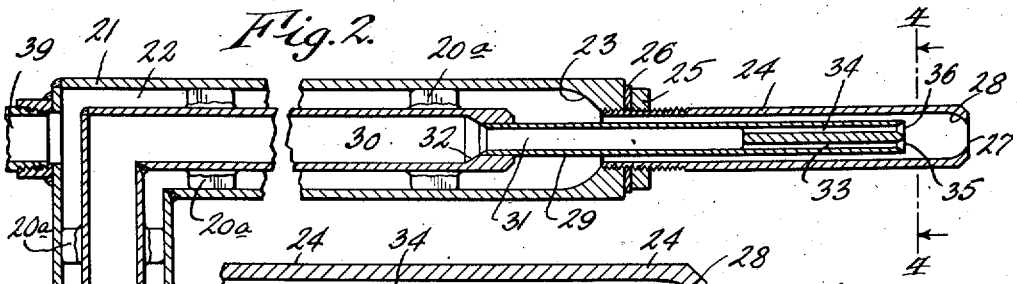
Fig. 2 is a longitudinal sectional elevation through the atomizing nozzle forming a part thereof.
Figure 3:
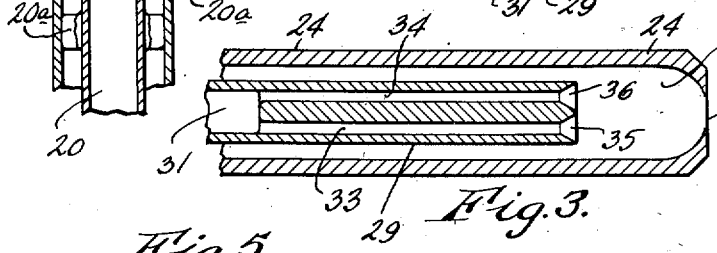
Fig. 3 is a longitudinal sectional elevation through the discharge end of said nozzle, on a somewhat larger scale.
Figure 4:
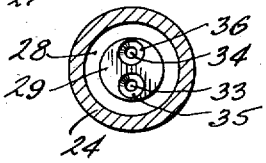
Fig. 4 is a sectional elevation through the discharge end of the nozzle, the section being taken substantially along the line 4—4 of Fig. 2.
Figure 5:
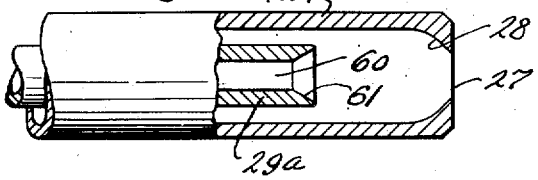
Fig. 5 is an elevation, partly in section, of the discharge end of another nozzle representing a modification of the invention in which but a single stream of the molten metal is mixed with the stream of hot gas.

In the example of the nozzle shown in Fig. 5, instead of a plurality of small streams being discharged into the passage 28 of the spraying sleeve 24, the extension 29a is provided with but a single discharge passage 60 which, like the passages 33 and 34 of Figs. 2 and 3, also has an outwardly divergent or flaring discharge end 61 which directs a diverging pencil or stream of molten lead into the passage 28 directly towards the discharge orifice 27. The passage 60 in this example may therefore be disposed approximately centrally of the passage 28 of the sleeve 24, and otherwise the construction is the same as described in connection with Figs. 1 to 4.

The dimensions of the passages 30, 31, 33, 34 and 28, and of the orifice 27, and the position of the extension 29 in front of the discharge orifice 27 may advantageously often be varied with the different materials and their viscosities being atomized or sprayed, and may be varied somewhat when one may desire to obtain varying degrees of fineness or uniformity of fineness of the product produced in accordance with this invention. In the atomizing of molten lead, for example, I have obtained excellent results where the passage 30 was circular in cross section and approximately ¾ of an inch in diameter, where the passage 31 was circular in cross section and approximately $\frac{5}{16}$ of an inch in diameter, where the passages 33 and 34 were circular in cross section and each of approximately $\frac{3}{32}$ of an inch in diameter, where the passages 33 and 34 were at least an inch long, where the distance from the free end of the extension 29, that is, from the orifices 35 and 36, to the discharge orifice 27 was greater than the diameter of the discharge orifice 27 and preferably at least ¾ of an inch to an inch, and where the diameter of the passage 28 immediately in front of the discharge orifice 27 was ¾ of an inch. In these examples the air pressure on the molten lead in the pot was from 30 to 35 pounds per square inch and in the passage 22 was from 60 to 100 pounds per square inch.

In the example illustrated in Fig. 5 where a single discharge passage 60 for the pencil of lead is utilized, good results have been obtained under the same air pressure, where the passage 60 had a diameter of ⅛ inch discharging toward a discharge orifice 27 which had a diameter of from $\frac{5}{16}$ inch to ⅜ inch diameter, and where the discharge end of passage 60 was from ¾ to 1 inch in front of the discharge orifice 27 and the air pressure the same as above given. Where a plurality of passages such as 33 and 34 are employed, I have found that if they are smaller than $\frac{3}{32}$ inch diameter they have considerable tendency to plug easily, especially where the air or gas pressure delivered to the spraying orifice 27 is at least approximately twice that on the molten lead forcing it out of the pot. I have found that where the distance from the discharge end of the extension 29 to the discharge orifice 27 is ½ inch or less, and pressures of at least 30 pounds per square inch on the molten lead and at least double that on the atomizing air, were used, the particles obtained did not have as high a proportion of very fine particles, as where the distance was increased to one inch so as to provide for greater travel of the diverging pencil of lead into the compressed air, before the two were discharged together through the restricted orifice 27. The area of the orifice is greater than that of the lead streams or aggregate areas of the lead streams where a plurality is employed, but not more than nine times the cross-sectional area of said stream or aggregate of streams.

While these dimensions and their proportions relative to one another may be varied to some extent, they give an approximation of the relative proportions or ratios between them which are preferable in order to obtain the best results. Lead atomized by the apparatus shown in Figs. 1 to 4, for example, when tested in a Scott volumeter has an apparent density of about 90 for the run of the material. The superfine component of the atomized lead which is taken from the dust collector through which passes all the air from the chamber 38, has an apparent density of about 50. The run of the product which is collected in the chamber 38 has an unusual uniformity in size. For example, in one average or normal run of atomized lead through this apparatus shown in Figs. 1 to 4, over 95% of the atomized lead falling and being collected in the chamber 38 was fine enough to pass freely through a 200 mesh screen. To put the same result in different terms, the total weight of a sample from an average or sample run, which was collected in the chamber 38, was 186.7 grams. The portion of that sample that went freely through a 200 mesh screen was 177.7 grams. Of the remainder which did not go through the 200 mesh screen, which was about 9 grams, I found that 7.9 grams would pass freely through a 100 mesh screen, and all the balance went through a 60 mesh screen. This last balance which went through the 60 mesh screen upon examination with a microscope appeared to be in rather flat flakes with relatively large surface areas which made such flakes easily oxidized.

In another average run or test according to this invention, a bright silvery colored powder was obtained, of which 2.0% was retained on a 100 mesh screen
2.0% was retained on a 150 mesh screen
3.4% was retained on a 200 mesh screen
1.6% was retained on a 250 mesh screen
9.2% was retained on a 325 mesh screen and 81.8% passed readily through the 325 mesh screen.

As explained hereinabove, the stream or streams of lead are discharged into the tubular stream of gas a substantial distance greater than ¼ inch away from the spraying orifice for the mixture, and this distance is preferably around ¾ to one inch. If the distance is increased, the molten lead and air will be in contact with one another for a longer period of travel before they are released and sprayed, and because of the fact that the temperature of the lead and air is well above the fusion point of the lead, and for best results, close to the temperature at which the lead tends to form litharge in the presence of air, there would be a tendency to form litharge in the spraying nozzle before the mixture is sprayed, if the time interval for the mixture to travel from the entrance of the lead stream into the air stream to the spraying orifice is too great. By increasing the pressure on both the lead and the air to increase their velocity when meeting one another, and in traveling through the mixing chamber 28, it is possible to increase the distance of travel of the two streams together before spraying without any serious difficulty from deposit or building up of litharge on the walls of the mixing chamber. If the temperature is dropped nearer to the fusion point of lead, the lead does not have maximum fluidity, and this increases the difficulty of getting disintegration of the lead stream into the extremely fine particles.

It will be understood that various changes in the details and materials, which have been herein described and illustrated in order to explain the nature of the invention, may be made by those skilled in the art within the principle and scope of the invention, as expressed in the appended claims.

I claim as my invention:

1. In the spraying of fused lead to reduce it to finely divided particles, the improved method which comprises passing a tubular stream of a gas having a temperature exceeding approximately 900° F. through a confined chamber and escaping from a substantially restricted, relatively short orifice in a wall of the chamber having an area not more than approximately ¼ the maximum cross sectional area of the chamber, under a moving pressure differential in excess of 50 pounds per square inch over atmospheric pressure outside of said chamber, and simultaneously discharging into the interior of said gas stream in said chamber in a direction generally towards said orifice, but at a point spaced from said orifice a distance ranging from about ½ inch to not materially greater than approximately one inch, a stream of molten lead having a cross sectional area less than the area of said orifice, a temperature exceeding approximately 900° F., and under a continuous, moving gaseous pressure differential over the atmospheric pressure outside of said chamber in excess of 25 pounds per square inch and sufficient to overcome the back pressure in said chamber created by said gas, whereby said streams will be sprayed together through said restricted orifice, and the lead will be reduced to finely divided particles before congealing.

2. In the spraying of fused lead to reduce it to finely divided particles, the improved method which comprises passing a tubular stream of a gas having a temperature exceeding approximately 900° F. through a confined chamber and escaping from a restricted, relatively short substantially restricted orifice in the wall of the chamber having an area not more than approximately ¼ the maximum cross sectional area of the chamber, under a moving pressure differential in excess of 50 pounds per square inch over atmospheric pressure outside of said chamber, and simultaneously discharging into the interior of said gas stream in said chamber in a direction generally towards said orifice, but at a point spaced from said orifice a distance ranging from about ½ inch to not materially greater than approximately one inch, a plurality of streams of molten lead having an aggregate cross sectional area less than the area of said orifice, a temperature exceeding approximately 900° F. and under a continuous, moving minimum pressure differential over the atmospheric pressure outside of said chamber in excess of 25 pounds per square inch and sufficient to overcome the back pressure in said chamber created by said gas, whereby said lead streams will be delivered into the gaseous stream in said chamber and then all of the streams sprayed together through said restricted orifice to reduce the lead to finely divided particles before congealing.

3. In the spraying of fused materials to reduce them to finely divided particles, the improved method which comprises passing a tubular stream of a gas through a confined chamber and releasing it from said chamber through a substantially restricted, relatively short orifice in a wall of the chamber, and under a moving pressure differential over the atmosphere outside of said chamber in excess of 50 pounds per square inch, simultaneously discharging into the interior of said gas stream within said chamber, in a direction generally toward said orifice but at a point spaced from said orifice a distance ranging from about ½ inch to not materially greater than approximately one inch, the molten materials in small stream-like form having an aggregate cross sectional area less than the area of said orifice, and at a temperature well above the fusion point of said materials and sufficient to produce approximately maximum fluidity without destruction and injury to the material, and under a continuous moving pressure differential over the atmospheric pressure outside of said chamber in excess of 25 pounds per square inch and sufficient to overcome the back pressure in said chamber created therein by said gaseous stream, and raising the temperature of the gaseous stream before it reaches said chamber to approximately the temperature of said materials discharged into said chamber, whereby the material discharged from said orifice will be in finely divided particles.

4. In the reduction of metallic lead to a finely divided condition, the improved method which comprises directing a stream of molten lead at a temperature of at least approximately 900° F., and under a moving pressure differential in excess of approximately 25 pounds per square inch over atmospheric pressure, into the interior of a confined tubular stream of the heated gas having a temperature of at least approximately 900° F. and under a moving pressure differential in excess of 50 pounds per square inch over atmospheric pressure, but not sufficient to create a back pressure on the lead stream sufficient to stop the flow of said lead stream, and in the same direction as the direction of travel of said stream of gas, spraying both streams through a substantially restricted, relatively short spraying orifice having an area greater than that of said lead stream, but not more than approximately nine times the cross sectional area of said lead stream as it is discharged into said gaseous stream, and disposed a distance ranging from about ½ inch to not materially greater than one inch in advance of the junction of the streams and regulating the moving pressure on said streams to discharge in the ratio of approximately 6 cubic feet of gas at 80 pounds per square inch pressure for each pound of lead sprayed.

5. In the spraying of fused materials to reduce them to a finely divided condition, the improved apparatus therefor which comprises a casing defining a closed chamber having a relatively short, substantially restricted, discharge orifice in a wall thereof, a plurality of small conduits opening into said chamber generally towards the said orifice at a distance ranging from approximately ½ inch to not greater than approximately one inch spaced from one another at the points of discharge into said chamber and having an aggregate total cross sectional area in said conduits, at approximately the discharge ends thereof, bearing a ratio to the face area of said orifice of not less than 1 to 8, means connecting the chamber of said casing to a heated gas under substantial pressure, means connected to said conduits for supplying thereto in molten condition the materials to be subdivided, and means for applying a substantial moving pressure differential to said molten materials for forcing them through said conduits and into said chamber and with said gas from the heating chamber through said orifice.

6. In the spraying of fused materials to reduce them to a finely divided powder, the improved apparatus which comprises a casing having a substantially restricted discharge orifice in one end thereof, a plurality of conduits opening into said casing in front of and towards said orifice at a distance greater than about ½ inch from the orifice and eccentrically to said orifice, the proportion between the face area of said orifice and the aggregate cross sectional areas of said conduits at their discharge ends, being approximately the proportion between two conduits of approximately $\frac{3}{32}$ inch diameter and an orifice of ⅜ inch.

7. In the reduction of metallic lead to a finely divided condition, the improved method which comprises directing molten lead in a small stream-like form at a temperature of at least approximately 900° F. and under a pressure in excess of approximately 25 pounds per square inch, and an aggregate cross sectional area approximately equal to the areas of two circles of $\frac{3}{32}$ inch diameter each, into the interior of a confined tubular stream of a heated gas having a temperature of at least approximately 900° F. and under a moving gaseous pressure in excess of 50 pounds per square inch over atmospheric pressure, and in the same direction as the direction of travel of said stream of gas, and spraying both gas and molten lead through a substantially restricted, relatively short, spraying orifice having an area not materially exceeding approximately that of a circle of ⅜ inch diameter, but greater than the aggregate cross sectional area of said molten lead as discharged into said gaseous stream and disposed at a distance of about ½ to about one inch from the junction of the streams.

8. In the spraying of fused lead to reduce it to finely divided particles, the improved method which comprises discharging a continuous stream of molten lead under gaseous pressure at a temperature in excess of approximately 900° F. into the interior of a confined, but substantially larger and tubular stream of gas of a temperature exceeding approximately 900° F., under substantial pressure at least approximately twice that moving said lead stream but insufficient to create a back pressure that will stop the flow of said lead stream, and then spraying a mixture of said streams from a substantially restricted spraying orifice located a distance of about ½ to about one inch from the junction of the streams with an abrupt and substantial fall in pressure on said mixture of streams as it passes said orifice, and regulating the ratio of compressed gas and molten lead discharged from said chamber to the proportions of approximately 6 cubic feet of gas at 80 pounds per square inch pressure for each pound of lead sprayed.

9. In the spraying of metallic lead to reduce it to finely divided particles, the improved method which comprises introducing a stream of molten lead at a temperature exceeding approximately 900° F. under a gaseous pressure in excess of 25 pounds per square inch into a confined but larger tubular body of gas having a temperature exceeding approximately 900° F. and under substantial pressure at least twice that on said lead, and then spraying the mixture of the molten metal and gas from a substantially restricted spray creating orifice in said chamber, spaced about ½ to about one inch from the entry of said lead stream into said gas body, larger than said lead stream but not more than approximately nine times the cross sectional area of said lead stream, into a space having a substantially lower pressure, whereby the mixture of molten metal and gas passing said orifice will undergo an abrupt and substantial fall in pressure.

10. In the spraying of metallic lead to reduce it to finely divided particles, the improved method which comprises introducing a stream of molten lead at a temperature exceeding approximately 900° F. under a gaseous pressure in excess of 25 pounds per square inch into a confined tubular but larger body of gas having a temperature exceeding approximately 900° F. and under substantial pressure at least twice that on said lead and then spraying the mixture of the molten metal and gas from a materially restricted orifice in said chamber spaced about ½ to about one inch from the entry of said lead stream into said gas body, larger than said lead stream but not more than approximately nine times the cross sectional area of said lead stream, into a space having a substantially lower pressure, whereby the mixture of molten metal and gas passing said orifice will undergo an abrupt and substantial fall in pressure, and regulating the ratio of compressed gas and molten lead discharged from said chamber to the proportions of approximately 6 cubic feet of gas at 80 pounds per square inch pressure for each pound of lead sprayed.

11. In the spraying of a fused material to reduce it to a finely divided condition, the improved apparatus therefor which comprises a casing defining a closed chamber having a substantially restricted, relatively short, spray-creating discharge orifice in a wall thereof, a tube having a passage opening into said chamber of said casing in a direction generally toward said orifice and at a point spaced from said orifice about ½ to about one inch, the cross sectional area of the passage of said tube at approximately its discharge end having a ratio to the face area of said orifice in the range approximately between 1 to 6 and 1 to 9, means connecting said chamber to a source of compressed hot gas, means connecting said tube to a source of said material in molten condition, and means for applying a gaseous pressure substantially above atmosphere to the body of said molten material to force it through said tube and discharge it into said chamber.

12. In the spraying of fused materials to reduce them to a finely divided condition, the improved apparatus therefor which comprises a casing defining a closed chamber having a relatively short, substantially restricted, spray-creating, discharge orifice in a wall thereof, said orifice having an area not more than approximately ¼ of the maximum cross sectional area of said chamber, a tube opening into said chamber and subdivided at its discharge end into a plurality of small passages opening towards said orifice and adapted to direct streams of a fluid therefrom toward the peripheral zone of the orifice, the aggregate cross sectional areas of said small passages being less than the area of said orifice, the discharge ends of said small passages being spaced from said orifice a distance about ½ to about one inch, the length of each of said small passages being greater than a plurality of times its diameter, means connected to said casing and opening into said chamber for supplying thereto a heated gas under substantial pressure, means connected to the main passage of said tube for supplying thereto in molten condition the material to be subdivided, and means for applying a substantial gaseous pressure greater than atmosphere to said molten material for forcing said molten material through said tube and discharging it into said chamber, and with said gas from said chamber through said orifice.

13. In the spraying of fused metallic lead to reduce it to a finely divided powder, the improved method which comprises discharging a small stream of said lead in molten condition and at a temperature above approximately 900° F. and under a gaseous pressure in excess of approximately 25 pounds per square inch, into a confined chamber containing a relatively larger body of a gas having a temperature above approximately 900° F. and under a pressure at least approximately double that on said lead but insufficient to create in said chamber a back pressure preventing flow of said lead into said chamber, which causes the discharge of said stream and intermixing of said gas and stream in said chamber, and then spraying the mixture of the gas and molten lead from said chamber through a substantially restricted, relatively short orifice having a face area greater than the cross sectional area of the lead stream discharged into said chamber but not more than approximately nine times such cross sectional area, into a space having a pressure substantially less than that in said chamber, whereby the mixture of lead and gas as it passes said orifice will be subject to an abrupt and substantial fall in pressure.

14. In the reduction of metallic lead to a finely divided condition, the improved method which comprises directing a stream of molten lead at a temperature of at least approximately 900° F. and under a pressure in excess of approximately 25 pounds per square inch, and of a cross sectional area approximately equal to that of a circle whose diameter is approximately $\frac{3}{32}$ inch, into the interior of a confined stream of a heated gas having a temperature of at least approximately 900° F. and under a moving gaseous pressure in excess of 60 pounds per square inch, and in the same direction as the direction of travel of said stream of gas, and spraying both streams through a restricted, short spraying orifice having an area approximately equal to that of a circle whose diameter is approximately $\frac{5}{16}$ to ⅜ inch when the diameter of said lead stream is approximately $\frac{3}{32}$ inch.

15. In the reduction of metallic lead to a finely divided condition, the improved method which comprises directing molten lead in stream form at a temperature of at least approximately 900° F. and under a pressure in excess of approximately 25 pounds per square inch, and of an aggregate cross sectional area approximately equal to that of a circle whose diameter is at least $\frac{3}{32}$ inch, into the interior of a confined stream of a heated gas having a temperature of at least approximately 900° F. and under a moving gaseous pressure in excess of 60 pounds per square inch, but insufficient to cut off the flow of lead, and in the same direction as the direction of travel of said stream of gas, and spraying both streams through a materially restricted, short spraying orifice spaced more than approximately ½ inch from the point of discharge of said lead in stream form into said gaseous stream, and having a face area materially greater than, but not more than nine times the total, aggregate cross sectional area of the lead as discharged in stream form into the gaseous stream.

16. In the spraying of fused material to reduce it to finely divided particles, the improved method which comprises passing a tubular stream of a gas through a confined tubular chamber and releasing it from said chamber through a substantially restricted, relatively short orifice in a wall thereof and of smaller diameter than the chamber and under a moving pressure differential over the atmosphere outside of said chamber, in excess of 50 pounds per square inch, simultaneously discharging into the interior of said gas stream within said chamber, in a direction generally toward said orifice but at a point spaced from said orifice a distance ranging from about ½ inch to not materially greater than approximately one inch, the molten material in small stream-like form having a cross sectional area less than the area of said orifice; and at a temperature well above the fusion point of said material and sufficient to produce approximately maximum fluidity without destruction and injury to the material, and under a continuous moving pressure differential over the atmospheric pressure outside of said chamber in excess of 25 pounds per square inch and sufficient to overcome the back pressure in said chamber created therein by said gaseous stream and raising the temperature of the gaseous stream before it reaches said chamber to approximately the temperature of said material discharged into said chamber whereby the material discharged from said orifice will be in finely divided particles.

17. In the spraying of fused lead to reduce it to finely divided particles, the improved method which comprises discharging a continuous stream of molten lead under gaseous pressure in excess of 25 pounds per square inch at a temperature in excess of approximately 900° F. into the interior of a confined, but substantially larger and tubular stream of gas of a temperature exceeding approximately 900° F., under substantial pressure at least approximately twice that moving said lead stream but insufficient to create a back pressure that will stop the flow of said lead stream, and then spraying a mixture of said streams from a substantially restricted spraying orifice located a distance of about ½ to about one inch from the junction of the streams with an abrupt fall in pressure on said mixture of streams as it passes said orifice, the orifice being smaller in diameter than the air stream but larger in diameter than the lead stream, and regulating the volume of compressed gas and molten lead discharged from said chamber in the ratio of approximately six cubic feet of gas at 80 pounds per square inch pressure for each pound of sprayed lead.

ALLAN W. FERGUSON.